(12) United States Patent
Chao et al.

(10) Patent No.: US 10,341,332 B2
(45) Date of Patent: Jul. 2, 2019

(54) SYSTEM AND METHOD FOR PROVIDING PERSISTENT USER IDENTIFICATION

(71) Applicant: International Business Machines Corporation, Armonk, NY (US)

(72) Inventors: Chih-Wen Chao, Taipei (TW); Cheng-Ta Lee, Taipei (TW); Wei-Shiau Suen, Taichung (TW); Ming-Hsun Wu, New Taipei (TW)

(73) Assignee: International Business Machines Corporation, Armonk, NY (US)

( * ) Notice: Subject to any disclaimer, the term of this patent is extended or adjusted under 35 U.S.C. 154(b) by 248 days.

(21) Appl. No.: 15/219,995

(22) Filed: Jul. 26, 2016

(65) Prior Publication Data
US 2018/0034797 A1     Feb. 1, 2018

(51) Int. Cl.
*H04L 29/06*     (2006.01)
*H04L 9/08*     (2006.01)

(52) U.S. Cl.
CPC .............. *H04L 63/083* (2013.01); *H04L 9/08* (2013.01); *H04L 63/06* (2013.01); *H04L 63/0853* (2013.01); *H04L 63/1483* (2013.01)

(58) Field of Classification Search
CPC . H04L 9/00; H04L 9/32; H04L 63/083; H04L 63/0272; H04L 63/06;
(Continued)

(56) References Cited

U.S. PATENT DOCUMENTS 7,386,889 B2    6/2008    Shay
8,156,549 B2*   4/2012    Rice .................. H04L 63/08
                                                 726/9
(Continued)

FOREIGN PATENT DOCUMENTS

CN            1564538 A     1/2005
WO    WO-2009007985 A2     1/2009

OTHER PUBLICATIONS

Barisch et al., "Integrating User Identity Management Systems with the Host Identity Protocol," IEEE Symposium on Computers and Communications, Jul. 5-8, 2009, pp. 830-836.
(Continued)

*Primary Examiner* — Thanhnga B Truong
(74) *Attorney, Agent, or Firm* — Pepper Hamilton LLP

(57) ABSTRACT

Embodiments provide a system and method for network tracking. Through various methods of packet encapsulation or IP option filling, one or more packets of information can be tagged with a unique security tag to prevent unauthorized access. A user agent can be validated by an authentication server through acceptance of one or more user credentials. The authentication server can generate a security token that can be transmitted to the user agent. The user agent can generate a keystream from the security token, and portions of that keystream can be attached to the packets as the security tag. The tagged packets can be forwarded to an authenticator, who can recreate the keystream from a copy of the security token provided by the authentication server. If the tags generated from the authenticator match the tags on the tagged packet, the authenticator can strip the tag from the tagged packet and forward the packet on to its next network address.

16 Claims, 4 Drawing Sheets

(58) Field of Classification Search
CPC . H04L 63/0853; H04L 9/0869; H04L 9/0662; H04K 1/00; G06F 11/30; G06K 7/0008
USPC ........ 713/154, 189–193, 150, 160; 726/7, 9, 726/27–30; 380/46, 28, 44, 45, 47, 270, 380/225, 262, 271, 35, 37, 42, 43; 705/73; 370/313
See application file for complete search history.

(56) References Cited

U.S. PATENT DOCUMENTS

| | | | | |
|---|---|---|---|---|
| 8,160,253 | B2* | 4/2012 | Fischer | G06K 7/0008 370/313 |
| 8,582,779 | B2* | 11/2013 | Messerges | H04L 9/321 380/247 |
| 8,972,571 | B2 | 3/2015 | Nappier et al. | |
| 9,443,084 | B2* | 9/2016 | Nice | G06F 21/31 |
| 2005/0213752 | A1* | 9/2005 | Hawkes | H04L 9/18 380/28 |
| 2006/0114863 | A1 | 6/2006 | Sanzgiri et al. | |

OTHER PUBLICATIONS

IEEE 802.1X. (n.d.). In Wikipedia. Retrieved Jul. 26, 2016, from https://en.wikipedia.org/wiki/IEEE_802.1X.

* cited by examiner

SYSTEM AND METHOD FOR PROVIDING PERSISTENT USER IDENTIFICATION

TECHNICAL FIELD

The present application relates generally to a system and method that can be used to concretely identify user identity for use in intrusion prevention systems.

BACKGROUND

In intrusion prevention systems, reliable user identification is a critical attribute in complying with an organization's security policy. User-based policies are necessary to control and monitor network access in an intranet/internet setting. Intrusion prevention systems, such as IBM's Security Network Protection, use internet protocol (IP) addresses in the network flow to bind a particular flow to a particular user identity, which can then be used to apply a corresponding security policy. For authentication, users must pass an SSL-encrypted login page, at which point their IP and MAC addresses are allowed to pass through the device. In other words, most common authenticator devices only utilize network identification to bind user identification.

However, existing authentication techniques are not secure enough. An authenticated user's IP and MAC addresses can be discovered by readily available packet sniffing programs. Non-authenticated users, after discovering the authenticated network addresses, can easily bypass existing authenticators by fabricating (spoofing) the authenticated IP and MAC addresses on the non-authenticated machine. User identification can be forged by anyone, so long as they have the ability to obtain a user's network identity. A particular problem with infiltrations of this type is the destruction of valid audit trails in the event of breaches. In the event network policies are violated, employees of breached systems can claim that their IP has been fabricated. In other words, security personnel are unable to persistently bind user identification to IP and MAC addresses.

SUMMARY

Embodiments can provide a computer implemented method in a data processing system comprising a processor and a memory comprising instructions, which are executed by the processor to cause the processor to implement a system for providing persistent user identification, the method comprising validating, through an authentication server, a user agent; sending, from the authentication server to the user agent, a security token; generating, by the user agent, a keystream from the security token; tagging, by the user agent, each of one or more packets of information with a security tag created from a portion of the keystream; forwarding, by the user agent, the one or more tagged packets to an authenticator; recreating, by the authenticator, one or more security tags based on the keystream generated by the security token; comparing, by the authenticator, the tagged packets against the one or more recreated security tags; and if one or more of the tagged packets match one of the recreated security tags, forwarding, by the authenticator, the packet to a network destination.

Embodiments can further provide a method further comprising stripping, by the authenticator, the security tag from the tagged packet before forwarding the packet to the network destination.

Embodiments can further provide a method further comprising pre-requesting, by the authenticator, the security token from the authentication server prior to the user agent forwarding the one or more tagged packets to the authenticator.

Embodiments can further provide a method further comprising tagging, by the user agent, each of the one or more packets of information with a tag created from the portion of the keystream that is unique to each of the one or more packets.

Embodiments can further provide a method further comprising generating, by the user agent, the keystream using a random seed of stream cyphers.

Embodiments can further provide a method further comprising generating, by the authentication server, the security token using a secure key distribution algorithm.

Embodiments can further provide a method further comprising updating, by the authentication server, the security token on a periodic database; and transmitting an updated security token to the user agent and authenticator.

Embodiments can further provide a method further comprising tagging through VLAN encapsulation, by the user agent, each of one or more packets of information with a security tag created from a portion of the keystream.

Embodiments can further provide a method further comprising tagging through IP option insertion, by the user agent, each of one or more packets of information with a security tag created from a portion of the keystream.

Embodiments can further provide a method further comprising installing a kernel module on the user agent to facilitate communication with the authenticator and the authentication server.

In another illustrative embodiment, a computer program product comprising a computer usable or readable medium having a computer readable program is provided. The computer readable program, when executed on a processor, causes the processor to perform various ones of, and combinations of, the operations outlined above with regard to the method illustrative embodiment.

In yet another illustrative embodiment, a system is provided. The system may comprise a persistent user identification provision processor configured to perform various ones of, and combinations of, the operations outlined above with regard to the method illustrative embodiment.

Additional features and advantages of this disclosure will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION OF EXEMPLARY EMBODIMENTS

Figure 1:
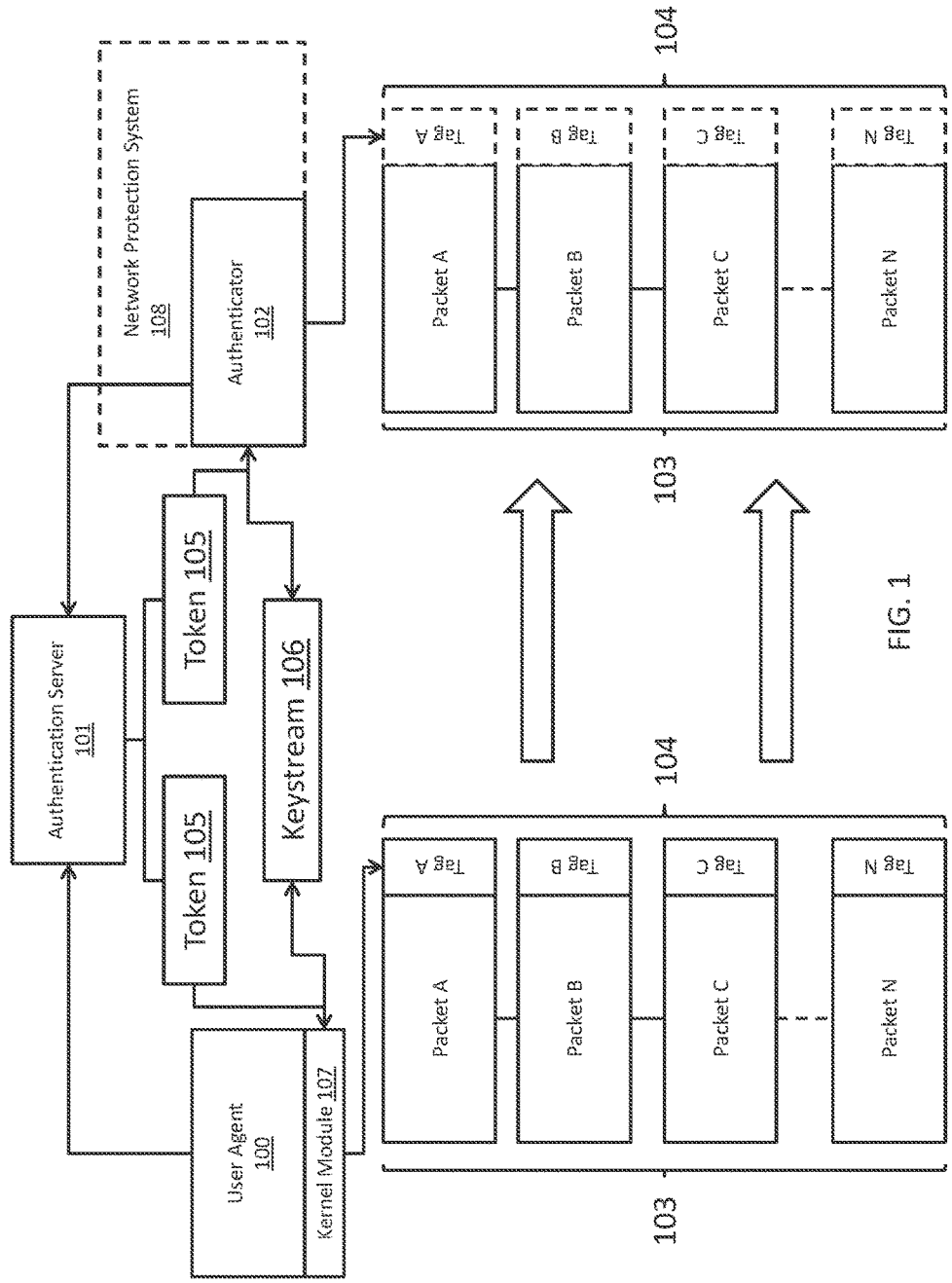
FIG. 1 depicts a schematic diagram of one illustrative embodiment of a network tracking system.

The present description and claims may make use of the terms "a," "at least one of," and "one or more of," with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within in the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples are intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the example provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a head disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN) and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including LAN or WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical functions. In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 depicts a schematic diagram of one illustrative embodiment of a persistent user identification system. Generally, the illustrated system leverages the technique of a "one-time-cypher" to propose an identity enforcement mechanism with the primary goal of binding network identity (examples including IP address, MAC address, etc.) with user identity (examples including usernames and passwords, certificates, etc.). The system forces a network identity modality to represent a valid user in a manner that cannot be repudiated or forged. This allows an authenticator 102 to have enough information provided to know if one or more packets 103 are sent from a valid user agent 100 and are no longer vulnerable to network identity forgery. In an embodiment, the authenticator 102 can be IBM's Security Network Protection, and can be used to control the network behavior of users in a network.

In an embodiment, a user agent 100 can authenticate user credentials with an authentication server 101. The authentication server 101 can validate the credentials of the user agent 100 through methods known in the art. The authentication server can adapt a secure key distribution algorithm (examples include Diffie-Hellman key exchange) to generate a security token 105, which can be shared between the user agent 100 and the authenticator 102. The user agent 100 can store the security token 105. When the user agent 100 performs a network action, the user agent 100 can utilize the security token 105 as a random seed of stream ciphers to generate a keystream 106 continuously. The user agent can then take a portion of the keystream 106 in sequence to insert into a particular packet 103 as a tag 104. In an embodiment, the portion of the keystream taken can be 16 or 32 bits. Each packet 103 can be tagged with a unique tag 104 that can be derived from the keystream 106 generated from the token 105. In an embodiment, the insertion of the tag 104 into the packet 103 can comply with existing network protocols in order to not increase the burden by any intermediary network devices. In an embodiment, additional caching mechanisms can be used between any of the user agent 100, authentication server 101, and authenticator 102 in order to improve network performance. In an embodiment, the authentication server 101 and/or authenticator 102 can cause the user agent 100 to generate the keystream 106 and tag each packet 103 with a security tag 104.

As the authenticator 102 receives one or more packets 103, the authenticator 102 can request the security token 105 from the authentication server 101. In an embodiment, the authenticator 102 can pre-request and receive the security token from the authentication server 101. The authenticator 102 can be located in a network protection system 108, such as a gateway, router, firewall, or intrusion prevention system (IPS). The authenticator 102 can then use the security token 105 to recreate the keystream 106 and compare the keystream 106 against the tag 104 attached to the packet 103 by generating one or more comparison tags. If the packet's tag 104 and the authenticator-recreated tag match, the authenticator 102 can accept the packet 103, remove the tag 104 attached by the user agent 100, and can transmit the tag-less packet 103 to its next destination in the network. In the event the tags do not match, the authenticator can reject the packet and/or generate an alert or log entry. In an alternate embodiment, the authenticator 102 can pass the packet 103 to its next network destination without removing the security tag 104. The authentication server 101 can periodically update the security token 105 shared between the user agent 100 and the authenticator 102 to ensure that a hacker or other malicious actor cannot replay network traffic in order to bypass the security check. The replacement of the token 105 can occur on an hourly, daily, weekly, or other predetermined basis.

In an embodiment, a user agent 100 (also known as a client side agent, such as IBM's BigFix™) can be used to authenticate with the authentication server 101 to retrieve the security token 105 used to calculate the security tags 104 installed on the packets 103 sent out from the client. The user agent 100 can authenticate with the authentication server 101 by communicating along a secure channel (examples include SSL). In an embodiment, the user agent can send one or more user credentials (username/password, certificate, etc.) to the authentication server 101 in order to retrieve the security token 105. A possible implementation of the client side agent is the installation of a kernel module 107 on the user agent 100 that can insert the additional information into the one or more packets 103. In an embodiment, the kernel module 107 can be a plug-in for "iptables," a Linux application allowing the configuration of a Linux kernel firewall, which can define a new set of actions that can be used in "iptables." After retrieval of the token 105, the kernel module 107 can generate a unique security tag 104 for each of the one or more packets 103. As will be described in more detail in FIGS. 2 and 3, the security tag 104 can be encapsulated with the packet 103 though VLAN tagging or as part of an IP option. Due to the randomness in the security tag 104 bound to the packet 103, it is extremely hard for any attacker to forge a packet with the correct security tag.

Advantages of the system include the enhancement of audit trail credibility for auditing and forensic analysis. The system can provide single sign-on (SSO) for one or more authenticators 102 within one authentication server 101, and can provide an accurate network access control on a corporate network. Additionally, an attacker cannot impersonate any authenticated users through faking an IP or MAC address, as the attacker would lack knowledge of the security token 105. As the security tag 104 can change from packet to packet 103, prediction of the security tag is impossible.

Figure 2:
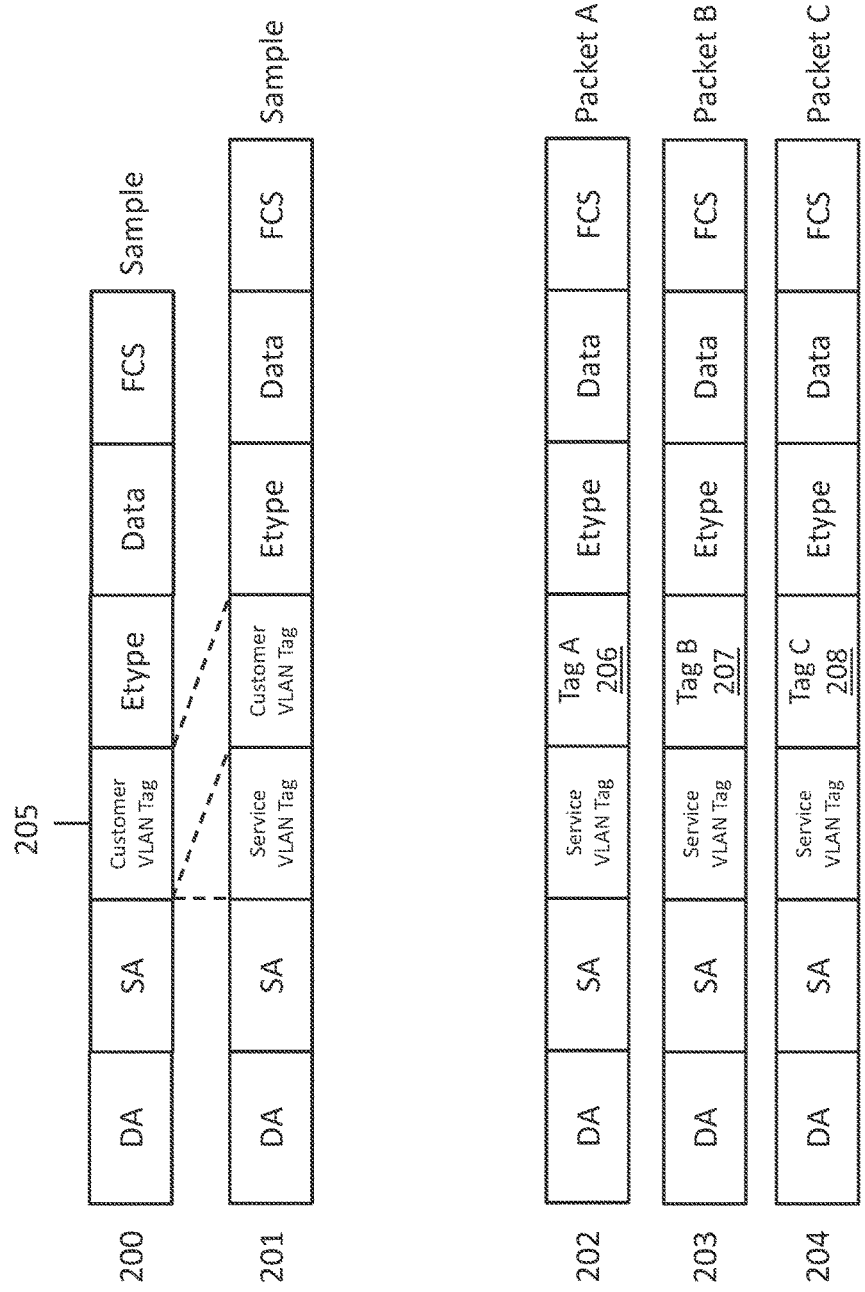
FIG. 2 depicts a schematic diagram of a network tracking system, according to embodiments described herein.
Figure 3:
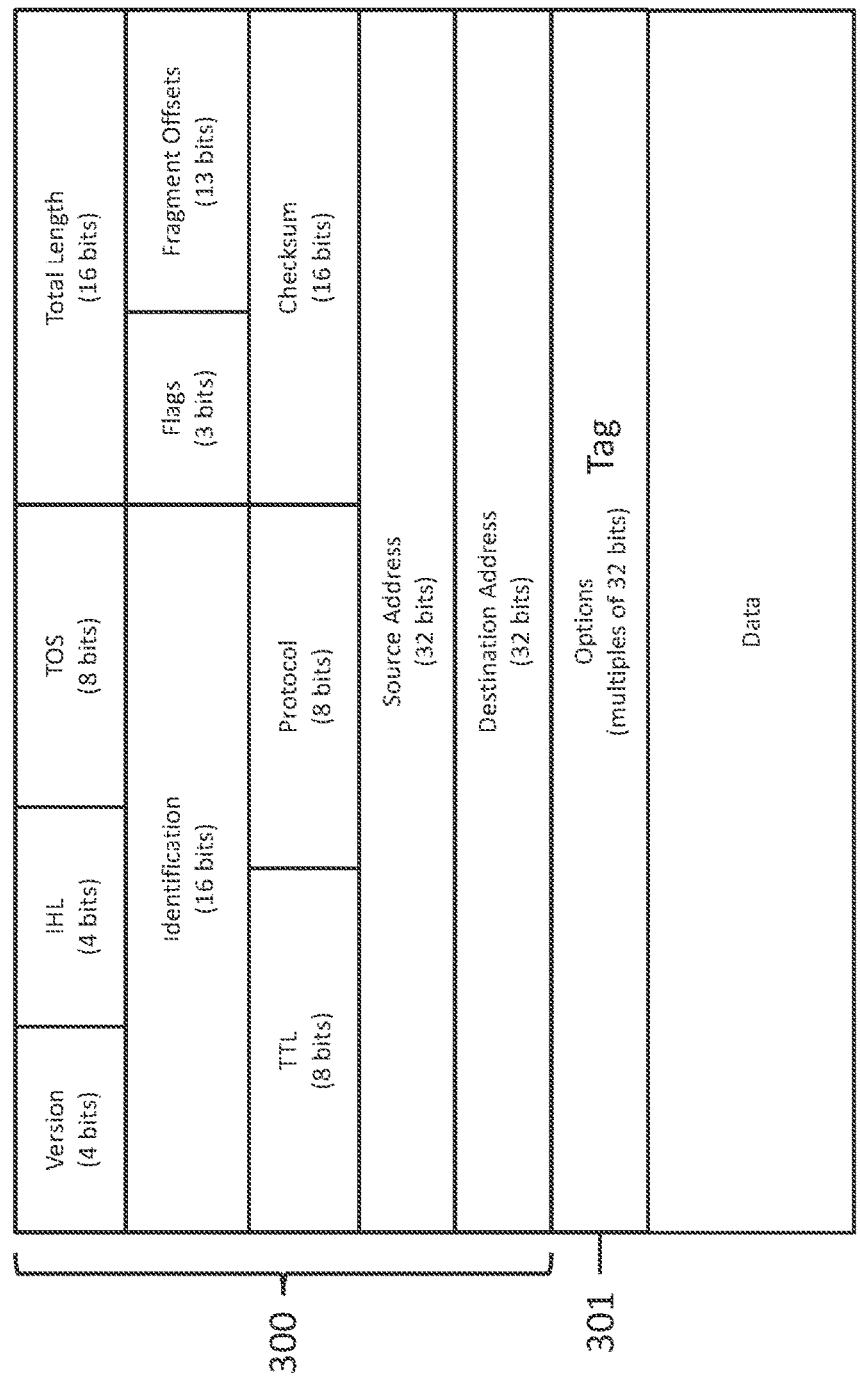
FIG. 3 depicts a block diagram illustrating the functionality of a network tracking system, according to embodiments described herein.

FIGS. 2 and 3 illustrate illustrative embodiments of encapsulating a security tag with a packet. The security tag can be encapsulated in any form, including VLAN tagging and IP option fields. FIG. 2 illustrates encapsulation using VLAN tagging. A single-tag frame structure packet 200 and double-tag frame structure packet 201 typically have a 6-byte destination address (DA) area, a 6-byte source address (SA) area, a 2-byte Ethertype (Etype) area, 46 to 1500 bytes of data, and a 4-byte frame check sequence (FCS) area. The difference between the single-tagged packet 200 and the double-tagged packet 201 is that while both the single-tagged packet and double-tagged packet both contain a 4-byte customer VLAN tag area 205, the double-tagged packet 201 can also contain an additional 4-byte service VLAN tag area. In an embodiment, the security tag can be inserted into the customer VLAN tag area 205. The security tag can be a percentage of the maximum VLAN tag area. For example, Packet A 202, Packet B 203, and Packet C 204 can each have unique security tags A 206, B 207, and C 208, respectively. As each respective packet is passed and authenticated by the authenticator, the authenticator can strip the security tag out of the packet by removing the customer VLAN tagging area and pass the stripped packet along to its intended network destination.

FIG. 3 illustrates insertion of the security tag into the IP option field 301. Typical IP datagrams include standard information 300, including version, internet header length (IHL), type of service (TOS), total length of the datagram, identification information, flags, fragment offsets, time to live (TTL), protocol, checksum, source address, and destination address information. Also included in an IP datagram is the options field 301. In an embodiment, the security tag can be inserted into the options field 301, and can be of a length that is a percentage of the maximum IP option field length. As in the VLAN embodiment, as each respective packet is passed and authenticated by the authenticator, the authenticator can strip the security tag out of the packet by clearing the IP option field and pass the stripped packet along to its intended network destination.

Figure 4:
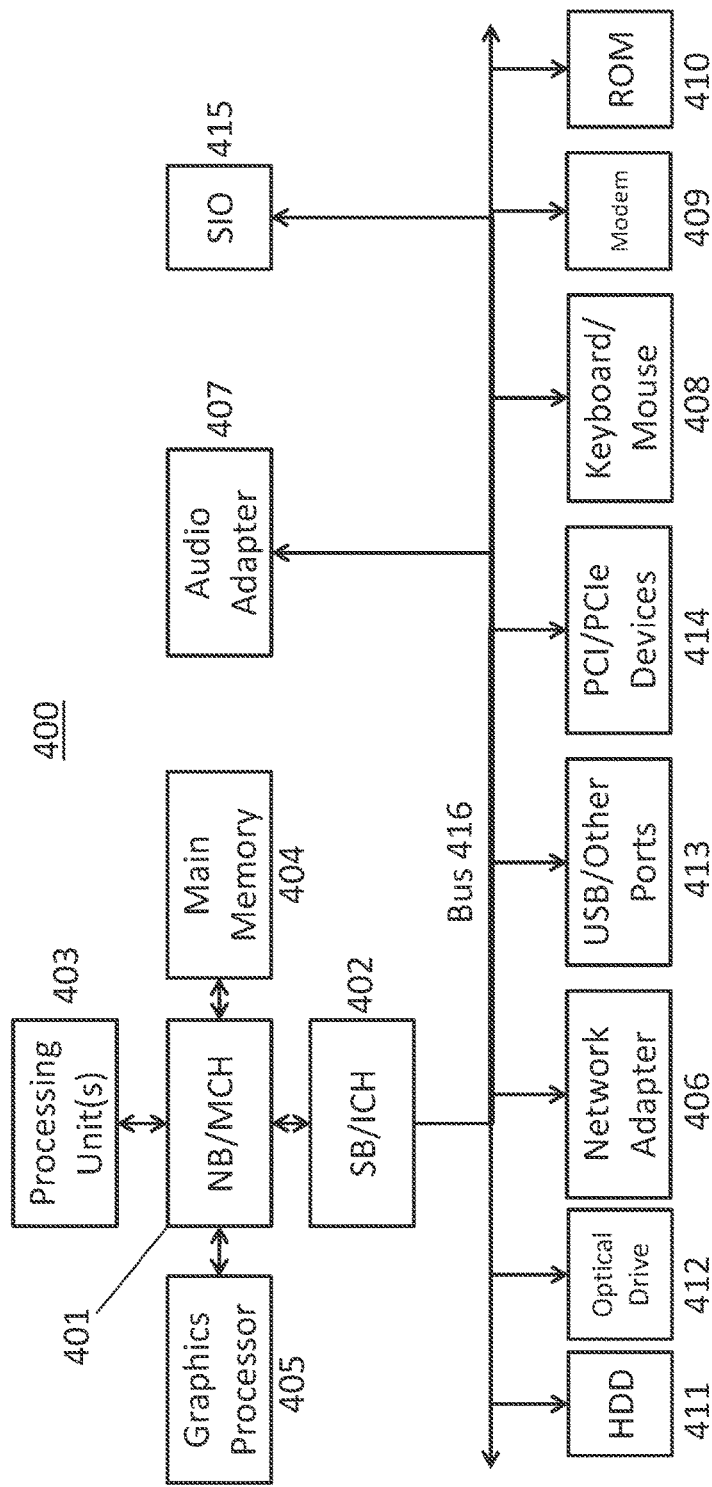
FIG. 4 is a block diagram of an example data processing system in which aspects of the illustrative embodiments may be implemented.

FIG. 4 is a block diagram of an example data processing system 400 in which aspects of the illustrative embodiments, such as the user agent, authenticator, and/or authentication server, can be implemented. Data processing system 400 is an example of a computer, such as a server or client, in which computer usable code or instructions implementing the process for illustrative embodiments of the present invention are located. In one embodiment, FIG. 4 represents a server computing device, such as a server, which implements the network tracking system described herein.

In the depicted example, data processing system 400 can employ a hub architecture including a north bridge and memory controller hub (NB/MCH) 401 and south bridge and input/output (I/O) controller hub (SB/ICH) 402. Processing unit 403, main memory 404, and graphics processor 405 can be connected to the NB/MCH 401. Graphics processor 405 can be connected to the NB/MCH through an accelerated graphics port (AGP).

In the depicted example, the network adapter 406 connects to the SB/ICH 402. The audio adapter 407, keyboard and mouse adapter 408, modem 409, read only memory (ROM) 410, hard disk drive (HDD) 411, optical drive (CD or DVD) 412, universal serial bus (USB) ports and other communication ports 413, and the PCI/PCIe devices 414 can connect to the SB/ICH 402 through bus system 416. PCI/PCIe devices 414 may include Ethernet adapters, add-in cards, and PC cards for notebook computers. ROM 410 may be, for example, a flash basic input/output system (BIOS). The HDD 411 and optical drive 412 can use an integrated drive electronics (IDE) or serial advanced technology attachment (SATA) interface. The super I/O (SIO) device 415 can be connected to the SB/ICH.

An operating system can run on processing unit 403. The operating system can coordinate and provide control of various components within the data processing system 400. As a client, the operating system can be a commercially available operating system. An object-oriented programming system, such as the Java™ programming system, may run in conjunction with the operating system and provide calls to the operating system from the object-oriented programs or applications executing on the data processing system 400. As a server, the data processing system 400 can be an IBM® eServer™ System P® running the Advanced Interactive Executive operating system or the Linux operating system. The data processing system 400 can be a symmetric multiprocessor (SMP) system that can include a plurality of processors in the processing unit 403. Alternatively, a single processor system may be employed.

Instructions for the operating system, the object-oriented programming system, and applications or programs are located on storage devices, such as the HDD 411, and are loaded into the main memory 404 for execution by the processing unit 403. The processes for embodiments of the network tracking system can be performed by the processing unit 403 using computer usable program code, which can be located in a memory such as, for example, main memory 404, ROM 410, or in one or more peripheral devices.

A bus system 416 can be comprised of one or more busses. The bus system 416 can be implemented using any type of communication fabric or architecture that can provide for a transfer of data between different components or devices attached to the fabric or architecture. A communication unit such as the modem 409 or network adapter 406 can include one or more devices that can be used to transmit and receive data.

Those of ordinary skill in the art will appreciate that the hardware depicted in FIG. 4 may vary depending on the implementation. Other internal hardware or peripheral devices, such as flash memory, equivalent non-volatile memory, or optical disk drives may be used in addition to or in place of the hardware depicted. Moreover, the data processing system 400 can take the form of any of a number of different data processing systems, including but not limited to, client computing devices, server computing devices, tablet computers, laptop computers, telephone or other communication devices, personal digital assistants, and the like. Essentially, data processing system 400 can be any known or later developed data processing system without architectural limitation.

The system and processes of the figures are not exclusive. Other systems, processes and menus may be derived in accordance with the principles of embodiments described herein to accomplish the same objectives. It is to be understood that the embodiments and variations shown and described herein are for illustration purposes only. Modifications to the current design may be implemented by those skilled in the art, without departing from the scope of the embodiments. As described herein, the various systems, subsystems, agents, managers and processes can be implemented using hardware components, software components, and/or combinations thereof. No claim element herein is to be construed under the provisions of 35 U.S.C. 112, sixth paragraph, unless the element is expressly recited using the phrase "means for."

Although the invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

What is claimed is:

1. A computer implemented method in a data processing system comprising a processor and a memory comprising instructions, which are executed by the processor to cause the processor to implement a system for providing persistent user identification, the method comprising:
    validating, by an authentication server, a credential of a user agent through a communication channel;
    sending, from the authentication server to the user agent, a security token;
    generating, by the user agent, a keystream from the security token received from the authentication server;
    generating, by the user agent, a plurality of security tags, wherein each security tag is a portion of the generated keystream in sequence;
    tagging, by the user agent, each of one or more packets of information with one of the plurality of security tags;
    pre-requesting, by an authenticator in a network protection system, the security token from the authentication server;
    receiving, by the authenticator, one or more tagged packets forwarded by the user agent;
    recreating, by the authenticator, one or more comparison security tags based on the keystream generated from the security token;
    comparing, by the authenticator, each security tag of the tagged packets against each of the corresponding recreated comparison security tags; and
    if each security tag of the tagged packets matches each recreated comparison security tag, forwarding, by the authenticator, the packet to a network destination.

2. The method as recited in claim 1, further comprising:
    stripping, by the authenticator, the security tag from the tagged packet before forwarding the packet to the network destination.

3. The method as recited in claim 1, further comprising:
    generating, by the user agent, the keystream using a random seed of stream cyphers.

4. The method as recited in claim 1, further comprising:
    generating, by the authentication server, the security token using a secure key distribution algorithm.

5. The method as recited in claim 1, further comprising:
    updating, by the authentication server, the security token on a periodic basis; and
    transmitting an updated security token to the user agent and authenticator.

6. The method as recited in claim 1, further comprising:
    tagging through VLAN encapsulation, by the user agent, each of one or more packets of information with one of the plurality of security tags.

7. The method as recited in claim 1, further comprising:
    tagging through IP option insertion, by the user agent, each of one or more packets of information with one of the plurality of security tags.

8. The method as recited in claim 1, further comprising:
    installing a kernel module on the user agent to facilitate communication with the authenticator and the authentication server.

9. A computer program product for providing persistent user identification, the computer program product comprising a computer readable storage medium having program instructions embodied therewith, the program instructions executable by a processor to cause the processor to:
    validate, by an authentication server, a credential of a user agent through a communication channel;
    send, from the authentication server to the user agent, a security token;
    cause the user agent to generate a keystream from the security token received from the authentication server;
    cause the user agent to generate a plurality of security tags, wherein each security tag is a portion of the generated keystream in sequence;
    cause the user agent to tag each of one or more packets of information with one of the plurality of security tags;
    pre-request, by an authenticator in a network protection system, the security token from the authentication server;
    cause the user agent to forward one or more tagged packets to the authenticator;
    recreate, by the authenticator, one or more comparison security tags based on the keystream generated from the security token;
    compare, by the authenticator, each security tag of the tagged packets against each of corresponding recreated comparison security tags; and
    if each security tag of the tagged packets matches each recreated comparison security tag, forward, by the authenticator, the packet to a network destination.

10. The computer program product as recited in claim 9, the processor further configured to:
    strip, by the authenticator, the security tag from the tagged packet before forwarding the packet to the network destination.

11. The computer program product as recited in claim 9, the processor further configured to:
    cause the user agent to generate the keystream using a random seed of stream cyphers.

12. The computer program product as recited in claim 9, the processor further configured to:
    generate, by the authentication server, the security token using a secure key distribution algorithm.

13. The computer program product as recited in claim 9, the processor further configured to:
    update, by the authentication server, the security token on a periodic basis; and
    transmit an updated security token to the user agent and authenticator.

14. The computer program product as recited in claim 9, the processor further configured to:
    cause the user agent to tag through VLAN encapsulation each of one or more packets of information with a security tag created from a portion of the keystream.

15. The computer program product as recited in claim 9, the processor further configured to:
    cause the user agent to tag through IP option insertion each of one or more packets of information with a security tag created from a portion of the keystream.

16. A system for providing persistent user identification, comprising:
    a processor configured to:
        validate, by an authentication server, a credential of a user agent through a communication channel;

send, from the authentication server to the user agent, a security token;
cause the user agent to generate a keystream from the security token received from the authentication server;
cause the user agent to generate a plurality of security tags, wherein each security tag is a portion of the generated keystream in sequence;
cause the user agent to tag each of one or more packets of information with one of the plurality of security tags;
pre-request, by an authenticator in a network protection system, the security token from the authentication server;
receive, by the authenticator, one or more tagged packets forwarded by the user agent;
recreate, by the authenticator, one or more comparison security tags based on the keystream generated from the security token;
compare, by the authenticator, each security tag of the tagged packets against each of corresponding recreated comparison security tags; and
if each security tag of the tagged packets matches each recreated comparison security tag, forward, by the authenticator, the packet to a network destination.

* * * * *